(12) United States Patent
Harris

(10) Patent No.: US 11,092,025 B2
(45) Date of Patent: Aug. 17, 2021

(54) GAS TURBINE ENGINE WITH DOVE-TAILED TOBI VANE

(71) Applicant: United Technologies Corporation, Farmington, CT (US)

(72) Inventor: Meggan Harris, Colchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/668,773

(22) Filed: Oct. 30, 2019

(65) Prior Publication Data

US 2020/0063582 A1 Feb. 27, 2020

Related U.S. Application Data

(63) Continuation of application No. 14/892,138, filed as application No. PCT/US2014/039668 on May 28, 2014, now Pat. No. 10,494,938.

(Continued)

(51) Int. Cl.
*F01D 9/06* (2006.01)
*F01D 9/04* (2006.01)
(Continued)

(52) U.S. Cl.
CPC ............ *F01D 9/065* (2013.01); *F01D 5/081* (2013.01); *F01D 9/04* (2013.01); *F01D 9/042* (2013.01);
(Continued)

(58) Field of Classification Search
CPC . F01D 9/023; F01D 9/04; F01D 9/042; F01D 9/045; F01D 9/065; F01D 5/081;
(Continued)

(56) References Cited

U.S. PATENT DOCUMENTS 4,026,659 A * 5/1977 Freeman, Jr. ........... F01D 5/186
415/115
4,126,405 A 11/1978 Bobo et al.
(Continued)

FOREIGN PATENT DOCUMENTS

| EP | 2423443 | 2/2012 |
|---|---|---|
| GB | 981476 | 1/1965 |
| GB | 1268301 | 3/1972 |

OTHER PUBLICATIONS

Extended European Search Report for European Application No. 14835907.8 dated Feb. 7, 2017.

(Continued)

*Primary Examiner* — Courtney D Heinle
*Assistant Examiner* — Danielle M. Christensen
(74) *Attorney, Agent, or Firm* — Carlson, Gaskey & Olds, P.C.

(57) ABSTRACT

A combustor assembly for a gas turbine engine includes a TOBI module that includes a TOBI housing. The TOBI housing has a slot. A vane includes a dovetail removably received within the slot. The TOBI housing includes an axially extending TOBI nozzle array. The TOBI housing includes a plenum. A cooling passage fluidly connects the plenum to the vane. The TOBI housing includes passages configured to provide cooling fluid to the vane. The TOBI housing includes a first passageway further connecting the TOBI nozzle to the plenum.

18 Claims, 3 Drawing Sheets

Related U.S. Application Data

(60) Provisional application No. 61/830,720, filed on Jun. 4, 2013.

(51) Int. Cl.
 F01D 5/08 (2006.01)
 F01D 25/12 (2006.01)
 F01D 5/30 (2006.01)

(52) U.S. Cl.
 CPC ............ F01D 25/12 (2013.01); *F01D 5/3007* (2013.01); *F05D 2220/3212* (2013.01); *Y02T 50/60* (2013.01)

(58) Field of Classification Search
 CPC . F01D 5/3007; F01D 25/12; F05D 2220/3212
 See application file for complete search history.

(56) References Cited

U.S. PATENT DOCUMENTS

| | | |
|---|---|---|
| 4,425,079 A | 1/1984 | Speak et al. |
| 4,526,511 A | 7/1985 | Levine |
| 4,805,398 A | 2/1989 | Jourdain et al. |
| 4,822,244 A | 4/1989 | Maier et al. |
| 5,402,636 A | 4/1995 | Mize et al. |
| 5,440,874 A | 8/1995 | Charier et al. |
| 5,501,575 A * | 3/1996 | Eldredge ............... F01D 5/3015 416/144 |
| 5,511,945 A | 4/1996 | Glezer et al. |
| 5,848,874 A | 12/1998 | Heumann et al. |
| 6,179,555 B1 | 1/2001 | Tremaine |
| 6,183,193 B1 | 2/2001 | Glasspoole et al. |
| 6,722,138 B2 * | 4/2004 | Soechting ................ F02C 7/18 60/785 |
| 6,974,306 B2 * | 12/2005 | Djeridane ............... F01D 5/081 416/1 |
| 7,195,453 B2 * | 3/2007 | Martin ...................... F01D 9/04 415/138 |
| 8,312,729 B2 | 11/2012 | Matwey et al. |
| 2003/0167775 A1 | 9/2003 | Soecting et al. |
| 2006/0275125 A1 | 12/2006 | Bibor et al. |
| 2007/0059158 A1 | 3/2007 | Alvanos et al. |
| 2010/0061862 A1 | 3/2010 | Bonini et al. |
| 2010/0275612 A1 | 11/2010 | Smoke et al. |
| 2012/0321453 A1 | 12/2012 | Alvanos |

OTHER PUBLICATIONS

International Preliminary Report on Patentability for PCT Application No. PCT/US2014/039668 dated Dec. 17, 2015.
International Serarch Report and Written Opinion for PCT/US2014/039668 completed Feb. 25, 2015.

* cited by examiner

GAS TURBINE ENGINE WITH DOVE-TAILED TOBI VANE

CROSS-REFERENCE TO RELATED APPLICATIONS

This application is a continuation of U.S. application Ser. No. 14/892,138, filed Nov. 18, 2015, which is a U.S. National Stage of International Application No. PCT/US2014/039668, filed May 28, 2014, which claims priority to U.S. Provisional Application No. 61/830,720, which was filed on Jun. 4, 2013.

STATEMENT REGARDING FEDERALLY SPONSORED RESEARCH OR DEVELOPMENT

This invention was made with government support under Contract No. FA8650-09-D-2923 awarded by the United States Air Force. The Government has certain rights in this invention.

BACKGROUND

This disclosure relates to a tangential onboard injector (TOBI) module used in a gas turbine engine. More particularly, the disclosure relates to vanes provided in the TOBI module.

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

TOBI vanes are provided in the combustor section and provide the first fixed stage of the turbine section. In one example, a first rotating stage of a high pressure turbine section is immediately downstream of the TOBI vanes. One typical arrangement TOBI vane arrangement includes an airfoil extending radially between and integrally connected to spaced apart inner and outer platforms. The inner and outer platforms typically have a forward flange that is fastened to fixed structure, such as a turbine housing at the inner flow path and an outer case at the outer flow path.

An array of integral TOBI nozzles is typically fastened to the inner TOBI flange to provide a TOBI module. The TOBI nozzles introduce cooling fluid to the first stage high pressure turbine rotor. Combustor and diffuser housings are separately secured to the TOBI module.

The loads on the TOBI mounting flanges must withstand driving loads and stresses from the core flow exiting the combustor section. These flanges may exhibit wear from rocking of the TOBI vanes during engine operation.

SUMMARY

In one exemplary embodiment, a combustor assembly for a gas turbine engine includes a TOBI module which includes a TOBI housing. The TOBI housing has a slot. A vane including a dovetail is removably received within the slot.

In a further embodiment of the above, the TOBI housing includes an axially extending TOBI nozzle array.

In a further embodiment of the above, the TOBI housing includes a plenum. A cooling passage fluidly connects the plenum to the vane.

In a further embodiment of the above, the TOBI housing includes passages configured to provide cooling fluid to the vane.

In a further embodiment of the above, the TOBI housing includes a first passageway further connecting the TOBI nozzle to the plenum.

In a further embodiment of the above, the TOBI housing includes a second passage configured to fluidly connect a cavity external to the TOBI nozzle to the plenum.

In a further embodiment of the above, the TOBI housing includes an access hole fluidly connected to the plenum that is configured to provide access to a fastener on an opposite side of the plenum from the access hole.

In a further embodiment of the above, the combustor assembly includes a diffuser case secured to the TOBI housing.

In a further embodiment of the above, the TOBI housing includes a stop adjacent to the slot. The stop provides an aftmost position of the vane with respect to the TOBI housing.

In a further embodiment of the above, the dovetail includes an edge abutting at least one of the diffuser case and a combustor housing.

In a further embodiment of the above, the combustor assembly includes a combustor housing secured to the diffuser case and TOBI housing.

In a further embodiment of the above, the vane includes a platform supporting a radially extending airfoil and providing an inner flow path surface. The dovetail is mounted to the platform.

In another exemplary embodiment, a gas turbine engine includes a combustor section which includes a combustor assembly. A turbine section has a first fixed stage. The combustor assembly includes a TOBI module which has a TOBI housing. The TOBI housing has a slot, and an array of vanes that provides the first fixed stage and includes a dovetail removably received within the slot.

In a further embodiment of the above, the TOBI housing includes an axially extending TOBI nozzle array and a plenum. A cooling passage fluidly connects the plenum to the vane. The TOBI housing includes passages configured to provide cooling fluid to the vane.

In a further embodiment of the above, the combustor assembly includes a combustor housing and a diffuser case secured to the TOBI housing.

In another exemplary embodiment, a fixed stage of a gas turbine engine includes an annular structured fixed to an engine static structure which includes multiple circumferentially arranged axially extending slots. An array of vanes are removable mounted in the slots. The vanes include airfoils extending radially outward from the slots.

In a further embodiment of the above, the annular structure provides a TOBI housing which has an axially extending TOBI nozzle array.

In a further embodiment of the above, a combustor housing and a diffuser case are secured to the TOBI housing.

In a further embodiment of the above, the TOBI housing includes a plenum. A cooling passage fluidly connects the plenum to the vane. The TOBI housing includes passages configured to provide cooling fluid to the vane.

In a further embodiment of the above, outer ends of the vanes are secured relative to the engine static structure.

BRIEF DESCRIPTION OF THE DRAWINGS

The disclosure can be further understood by reference to the following detailed description when considered in connection with the accompanying drawings wherein.

DETAILED DESCRIPTION

Figure 1:
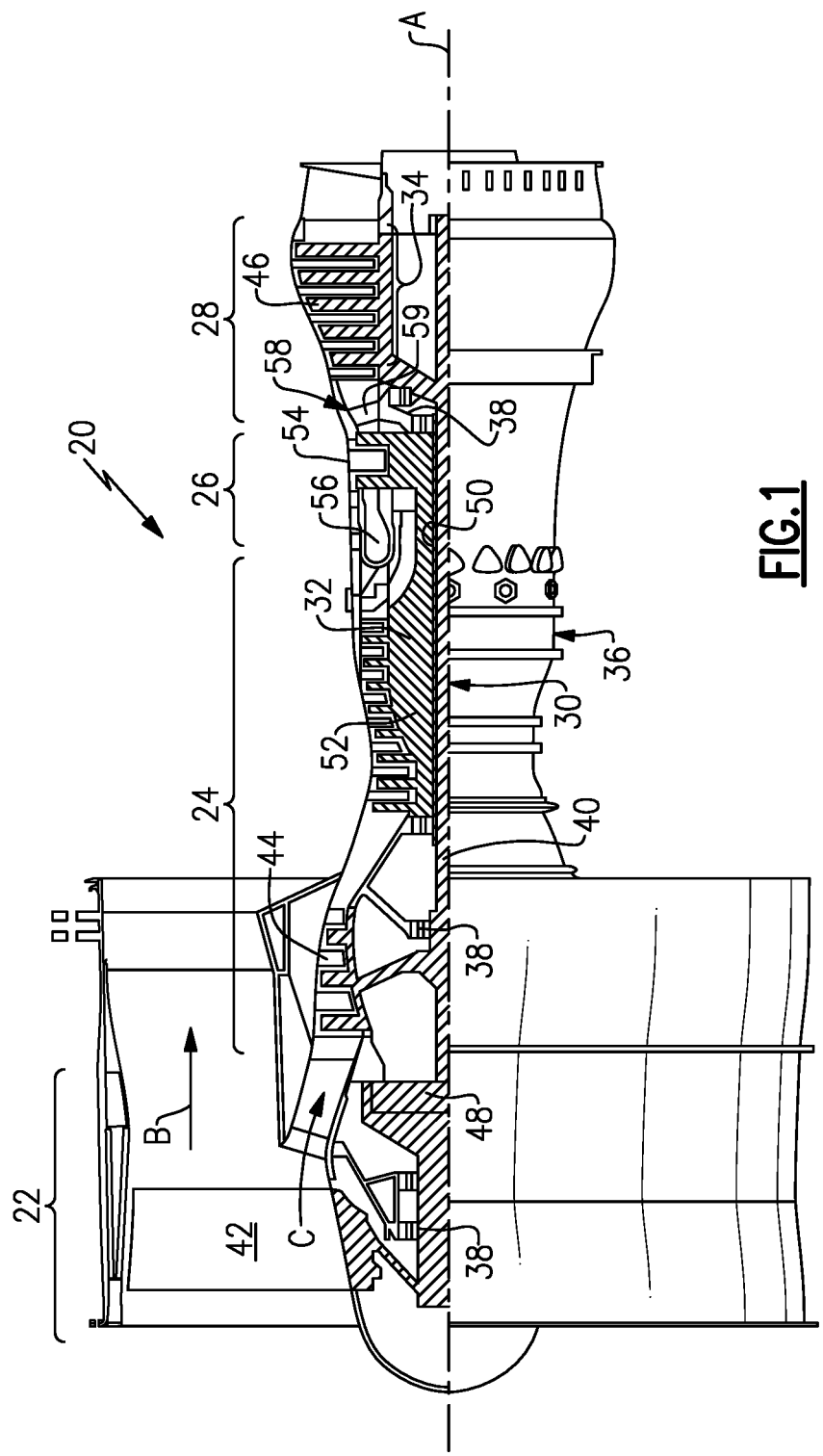
FIG. 1 is a schematic view of an example gas turbine engine including a combustor.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high-pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high-pressure compressor 52 and the high-pressure turbine 54. In one example, the high-pressure turbine 54 includes at least two stages to provide a double stage high-pressure turbine 54. In another example, the high-pressure turbine 54 includes only a single stage. As used herein, a "high pressure" compressor or turbine experiences a higher pressure than a corresponding "low pressure" compressor or turbine.

The example low-pressure turbine 46 has a pressure ratio that is greater than about 5. The pressure ratio of the example low-pressure turbine 46 is measured prior to an inlet of the low-pressure turbine 46 as related to the pressure measured at the outlet of the low-pressure turbine 46 prior to an exhaust nozzle.

A mid-turbine frame 58 of the engine static structure 36 is arranged generally between the high-pressure turbine 54 and the low-pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 59, which are in the core airflow path and function as an inlet guide vane for the low-pressure turbine 46. Utilizing the vane 59 of the mid-turbine frame 58 as the inlet guide vane for low-pressure turbine 46 decreases the length of the low-pressure turbine 46 without increasing the axial length of the mid-turbine frame 58. Reducing or eliminating the number of vanes in the low-pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example-geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low-pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of [(Tram °R)/518.7] 0.5. The "Low corrected fan tip speed", as disclosed herein according to one non-limiting embodiment, is less than about 1150 ft/second.

Figure 2:
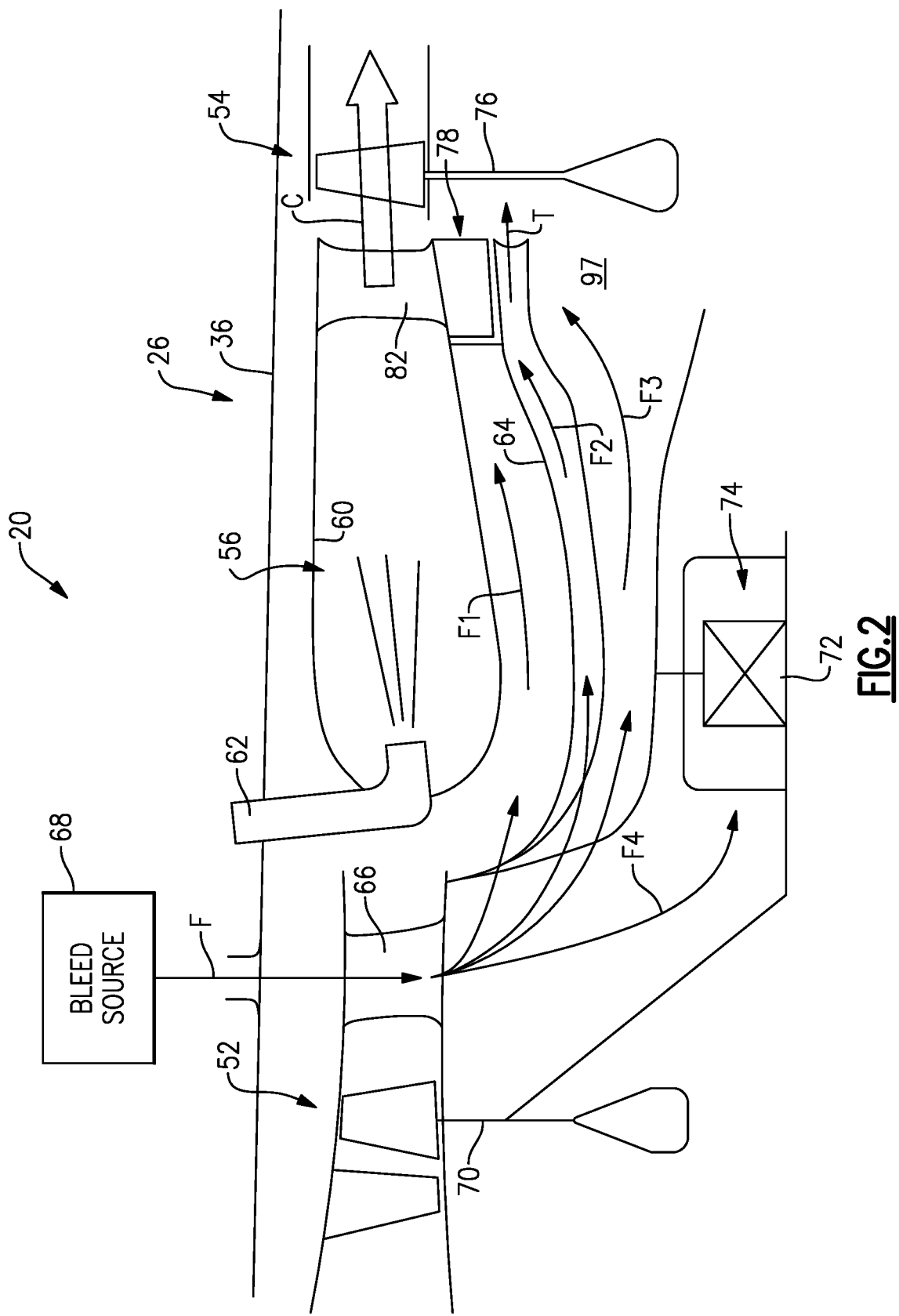
FIG. 2 is an enlarged schematic view of a gas turbine engine in the area of the combustor.

An area of the combustor section 26 is shown in more detail in FIG. 2. The combustor section 26 includes a combustor 56 having a combustor housing 60. An injector 62 is arranged at a forward end of the combustor housing 60 and is configured to provide fuel to the combustor housing 60 where it is ignited to produce hot gases that expand through the turbine section 54.

A diffuser case 64 is secured to the combustor housing 60 and fixed relative to the engine static structure 36. Exit vanes 66 are arranged downstream from the compressor section 52 and upstream from the combustor section 26. A bleed source 68, such as fluid from a compressor stage, provides cooling fluid F through the exit vanes 66 to various locations within the gas turbine engine 20.

The compressor section 52 includes a compressor rotor 70 supported for rotation relative to the engine static structure 36 by a bearing 72. The bearing 72 is arranged within a bearing compartment 74. The turbine section 54 includes a turbine rotor 76 arranged downstream from a TOBI module 78. The TOBI module 78 supports a circumferential array of vanes 82 that are arranged upstream from the turbine rotor 76. The vanes 82 provide the first fixed stator stage of the turbine section 54.

The fluid F is distributed to various locations within the gas turbine engine 20 for a variety of uses. In one example, the fluid F provides cooling fluid F1 supplied to an area between the combustor housing 60 and the diffuser case 64. A cooling fluid F2 is supplied to the TOBI module 78 to supply TOBI air T for cooling the turbine rotor 76. A fluid F3 is supplied to a cavity 97 forward of the turbine rotor 76 to an air seal (not shown) in that region, and a fluid F4 is provided to air seals (not shown) in the area of the bearing compartment 74 to maintain lubrication oil within the bearing compartment 74.

Figure 3:
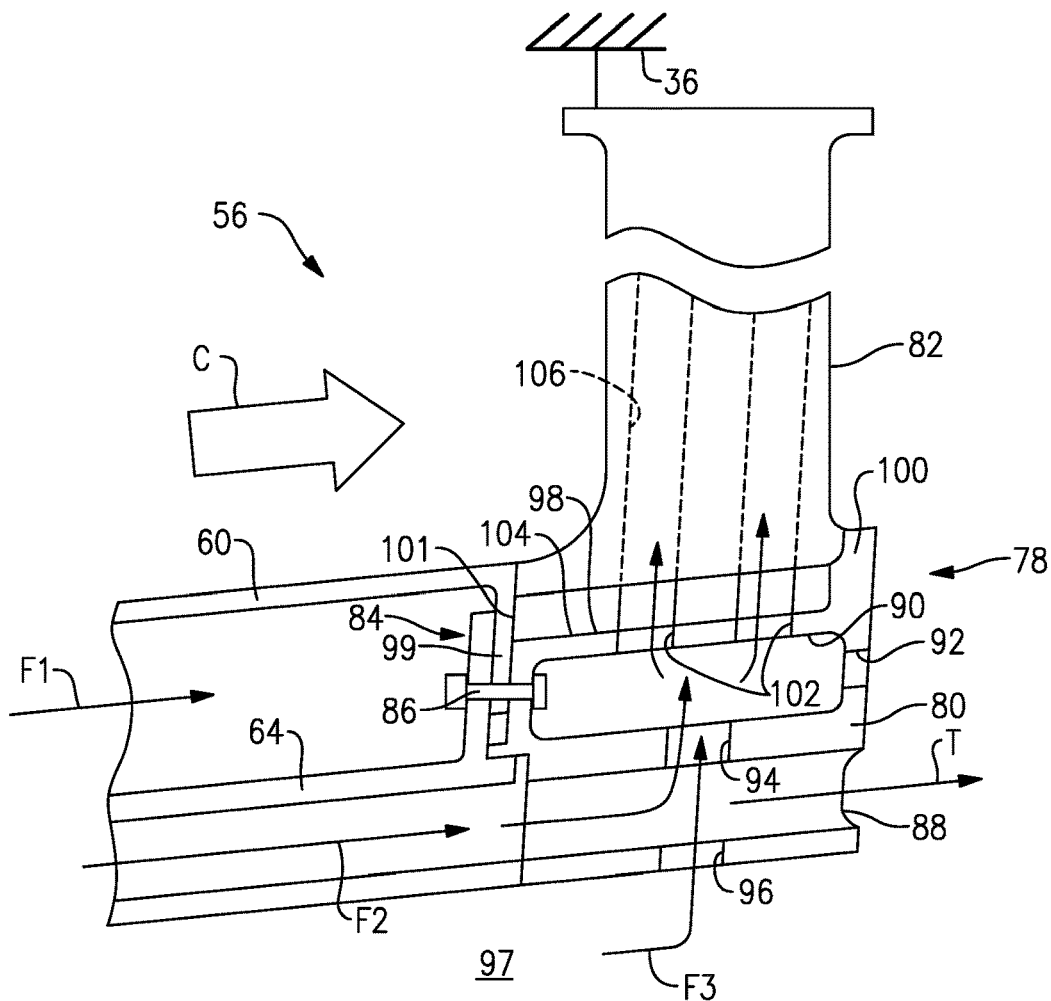
FIG. 3 is an enlarged schematic cross-sectional view through a portion of the TOBI module.

The combustor section 26 is shown in more detail in FIG. 3. The TOBI module 78 includes a TOBI housing 80 that removably supports the circumferential array of the vanes 82. In one example, the TOBI housing 80 is secured to the combustor housing 60 and the diffuser case 64 at a flanged joint 84 by fasteners 86.

The TOBI housing 80 is a unitary, annular structure in one example and includes a circumferential array of TOBI nozzles 88 that direct the TOBI fluid T in an area forward of the turbine rotor 76 (FIG. 2). In one example, the TOBI housing 80 includes a plenum 90 that is supplied the cooling fluid F2 through a first passageway 94. An access hole 92 is provided opposite the fastener 86 to permit an assembly tool access to the fastener 86. A small amount of fluid permissibly may leak from the plenum 90 through the access hole 92. Fluid F3 from the cavity 97 may enter the plenum 90 through a second passageway 96 also, if desired.

The TOBI housing 80 includes one or more openings 102 that communicate cooling fluid from the plenum 90 to cooling passageways 106 within the vane 82.

Figure 4:
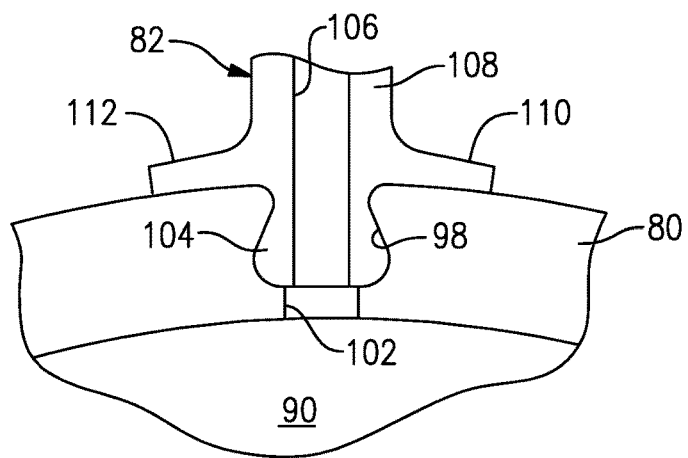
FIG. 4 is an end view of a portion of the TOBI module shown in FIG. 3.

Referring to FIGS. 3 and 4, the TOBI housing 80 includes an axially extending slot 98 that extends to a stop 100 located at an aft end of the TOBI housing 80. The vanes 82 each include a dovetail 104 that is received within the slot 98. Thus, the vanes 82 better distribute loads acting on the vanes from the dovetail 104 to the slot 98 throughout various engine operating conditions. With reduced stresses, a lower strength material may be used, such as a molybdenum-silicon-boron alloy. Moreover, the vanes 82 are replaceable and the set of fasteners used to secure the inner flange to the combustor housing can be eliminated. It should be understood that the dovetail 104 may include any suitable geometry, for example, a fir tree configuration.

A forward edge 101 of the dovetail 104 is generally flush with the forward face of the TOBI housing 80. The edge 101 abuts a flange 99 of the combustor housing 60 in the example shown. In this manner, the stop 100 and the flange 99 cooperate to maintain a desired axial position of the vanes 82.

An outer end of the vanes 82 may be secured with respect to the engine static structure 36 in any suitable manner. For example, a dovetail arrangement may be provided at the outer diameter of the vanes 82, or mounting flanges may be used.

In the example, the vanes 82 each include a platform 110 supporting a radially extending airfoil 108. The platform 110 provides an inner flow path surface 112. One vane and platform is shown in FIG. 4, although multiple vanes 82 of platforms are arranged circumferentially about the TOBI housing 80. Although a single vane is shown, clusters of vanes may also be used and mounted to the TOBI housing as an assembly.

Although an example embodiment has been disclosed, a worker of ordinary skill in this art would recognize that certain modifications would come within the scope of the claims. For that reason, the following claims should be studied to determine their true scope and content.

What is claimed is:

1. A combustor assembly for a gas turbine engine comprising:
   a TOBI module including a TOBI housing, the TOBI housing having a slot; and
   a vane including a dovetail removably received within the slot, wherein the TOBI housing includes an axially extending TOBI nozzle array, the TOBI housing includes a plenum, and a cooling passage fluidly connects the plenum to the vane, the TOBI housing includes passages configured to provide cooling fluid to the vane, the TOBI housing includes a first passageway further connecting the TOBI nozzle to the plenum, wherein the cooling fluid flows from the TOBI nozzle, through the first passageway into the plenum, then from the plenum through the cooling passage into the vane.

2. The combustor assembly according to claim 1, wherein the TOBI housing includes an access hole fluidly connected to the plenum and configured to provide access to a fastener on an opposite side of the plenum from the access hole.

3. The combustor assembly according to claim 1, comprising a diffuser case secured to the TOBI housing.

4. The combustor assembly according to claim 1, wherein the TOBI housing includes a stop adjacent to the slot, the stop providing an aftmost position of the vane with respect to the TOBI housing.

5. The combustor assembly according to claim 1, wherein the dovetail includes an edge abutting at least one of diffuser case and a combustor housing.

6. The combustor assembly according to claim 5, comprising a combustor housing secured to the diffuser case and TOBI housing.

7. The combustor assembly according to claim 1, wherein the vane includes a platform supporting a radially extending airfoil and providing an inner flow path surface, and the dovetail is mounted to the platform.

8. The combustor assembly according to claim 1, wherein the TOBI housing is a unitary annular structure.

9. A combustor assembly for a gas turbine comprising:
   a TOBI module including a TOBI housing, the TOBI housing having a slot; and a vane including a dovetail removably received within the slot, wherein the TOBI housing includes an axially extending TOBI nozzle array, the TOBI housing includes a plenum, and a cooling passage fluidly connects the plenum to the vane, the TOBI housing includes passages configured to provide cooling fluid to the vane, the TOBI housing includes a first passageway further connecting the TOBI nozzle to the plenum, wherein the dovetail includes an edge abutting at least one of the diffuser case and a combustor housing, wherein the TOBI housing includes a second passage configured to fluidly connect a cavity external to the TOBI nozzle to the plenum.

10. A fixed stage of a gas turbine engine comprising:

an annular structured fixed to an engine static structure and including multiple circumferentially arranged axially extending slots;

an array of vanes, each of the vanes comprising a dovetail removably mounted in the slots, the vanes including airfoils extending radially outward from the slots; and wherein the annular structure provides a TOBI housing having an axially extending TOBI nozzle array, wherein the TOBI housing includes a plenum, and a cooling passage fluidly connects the plenum to the vane, and the TOBI housing includes passages configured to provide cooling fluid to the vane, wherein the cooling fluid flows from the TOBI nozzle array, through a first passageway into the plenum, then from the plenum through the cooling passage into the vane.

11. The fixed stage according to claim 10, wherein a combustor housing and a diffuser case are secured to the TOBI housing.

12. The fixed stage according to claim 11, wherein the TOBI housing is a unitary annular structure.

13. The fixed stage according to claim 10, wherein outer ends of the vanes are secured relative to the engine static structure.

14. The fixed stage according to claim 10, wherein the TOBI housing includes passages configured to provide cooling fluid to the vane via the plenum.

15. The fixed stage according to claim 10, wherein a nozzle of the TOBI nozzle array is fluidly connected to the plenum via a first passageway.

16. The fixed stage according to claim 10, wherein the TOBI housing is configured to be secured to a combustor housing and a diffuser case.

17. The fixed stage according to claim 10, wherein the TOBI housing includes an access hole fluidly connected to the plenum and configured to provide access to a fastener on an opposite side of the plenum from the access hole.

18. The fixed stage according to claim 10, wherein the TOBI housing includes a stop adjacent to the slot, the stop providing an aftmost position of the vane with respect to the TOBI housing.

* * * * *